US012812755B2

(12) United States Patent
Nick

(10) Patent No.: US 12,812,755 B2
(45) Date of Patent: Nov. 24, 2026

(54) SYSTEMS AND METHODS FOR COMMUNICATION OF SPATIOTEMPORAL PATTERNS

(71) Applicant: Microsoft Technology Licensing, LLC, Redmond, WA (US)

(72) Inventor: Teresa A. Nick, Towson, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/612,846

(22) Filed: Mar. 21, 2024

(65) Prior Publication Data

US 2025/0301555 A1 Sep. 25, 2025

(51) Int. Cl.
*H05B 47/195* (2020.01)
*G06K 7/14* (2006.01)

(52) U.S. Cl.
CPC ......... *H05B 47/195* (2020.01); *G06K 7/1417* (2013.01)

(58) Field of Classification Search
CPC .... H05B 47/195; G06K 7/1417; H04B 10/29; H04B 10/803; H04B 10/116
See application file for complete search history.

(56) References Cited

U.S. PATENT DOCUMENTS 6,795,655 B1 * 9/2004 Sidorovich ............ H04B 10/40 398/118
8,611,756 B1 12/2013 Wach
9,113,508 B2 * 8/2015 Wendt .................. H05B 47/165
2012/0033295 A1 2/2012 Presi
2017/0261314 A1 9/2017 Konolige
2018/0018760 A1 1/2018 Chang
2021/0158687 A1 5/2021 Beauchamp

OTHER PUBLICATIONS

Janbi, et al., "Distributed artificial intelligence: Taxonomy, review, framework, and reference architecture", Intelligent Systems with Applications, May 10, 2023, 43 pages.
Majumder, et al., "ZeRO—Infinity and DeepSpeed: Unlocking unprecedented model scale for deep learning training", Microsoft Research Blog, Apr. 19, 2021, 11 pages.
Rajbhandari, et al., "ZeRO: Memory Optimizations Toward Training Trillion Parameter Models", Microsoft, 2020, 2 pages.
Communication pursuant to Rule 69 EPCA—reminder concerning payment of the designation fee (Art. 79(2) EPC) and of the examination fee (Art. 94(1) EPC)—and invitation pursuant to Rule 70a(1) Received in European Patent Application No. 25163584.3 mailed on Sep. 29, 2025, 02 pages.
The extended European search report Received for European Application No. 25163584.3, mailed on Aug. 26, 2025, 08 pages.

* cited by examiner

*Primary Examiner* — Daniel D Chang
(74) *Attorney, Agent, or Firm* — Ray Quinney & Nebeker P.C.; John O. Carpenter

(57) ABSTRACT

A device may include a light source array including a plurality of light sources. A device may include a light receptor array including a plurality of light receptors wherein at least one pixel of the light source array includes both a light source and a light receptor. A device may include a repeater controller in data communication with the light receptor array and configured to: receive a first spatiotemporal pattern at the light receptor array and drive at least a portion of the light source array based at least partially on the first spatiotemporal pattern to emit a second spatiotemporal pattern.

20 Claims, 7 Drawing Sheets

SYSTEMS AND METHODS FOR COMMUNICATION OF SPATIOTEMPORAL PATTERNS

BACKGROUND

High performance computing tasks, such as machine learning model training and utilization, includes multiple computers performing different tasks and communicating with one another. Latency in data communication within a computing location, such as a server room, server rack, co-location or datacenter can be a limiting factor on processing speeds. Robust optical communication can transmit data efficiently and reliably in a computing system.

BRIEF SUMMARY

In some aspects, the techniques described herein relate to a device for communicating spatiotemporal patterns including: a light source array including a plurality of light sources; a light receptor array including a plurality of light receptors wherein at least one pixel of the light source array includes both a light source and a light receptor; and a repeater controller in data communication with the light receptor array and configured to: receive a first spatiotemporal pattern at the light receptor array, and drive at least a portion of the light source array based at least partially on the first spatiotemporal pattern to emit a second spatiotemporal pattern.

In some aspects, the techniques described herein relate to a system for communicating spatiotemporal patterns, the system including: a spatiotemporal pattern transmitter configured to transmit a first spatiotemporal pattern; a spatiotemporal pattern receiver configured to receive a second spatiotemporal pattern; and a repeater device including: a light source array including a plurality of light sources; a light receptor array including a plurality of light receptors wherein at least one pixel of the repeater device includes both a light source and a light receptor; and a repeater controller in data communication with the light receptor array and configured to: receive a first spatiotemporal pattern at the light receptor array, and drive at least a portion of the light source array based at least partially on the first spatiotemporal pattern to emit a second spatiotemporal pattern.

In some aspects, the techniques described herein relate to a method for communicating spatiotemporal patterns, the method including: detecting an input spatiotemporal pattern with a light receptor array of a repeater device; driving a plurality of light sources in a light source array of the repeater device based at least partially on the input spatiotemporal pattern; and transmitting an output spatiotemporal pattern generated by the plurality of light sources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 and FIG. 2-2 illustrate a repeater device and an input spatiotemporal pattern detected by the repeater device, according to at least some embodiments of the present disclosure.

FIG. 3-1 and FIG. 3-2 illustrate another repeater device and input spatiotemporal pattern detected by the repeater device, according to at least some embodiments of the present disclosure.

FIG. 6-1 and FIG. 6-2 illustrate combining two-dimensional spatiotemporal patterns, according to at least some embodiments of the present disclosure.

DETAILED DESCRIPTION

Figure 1:
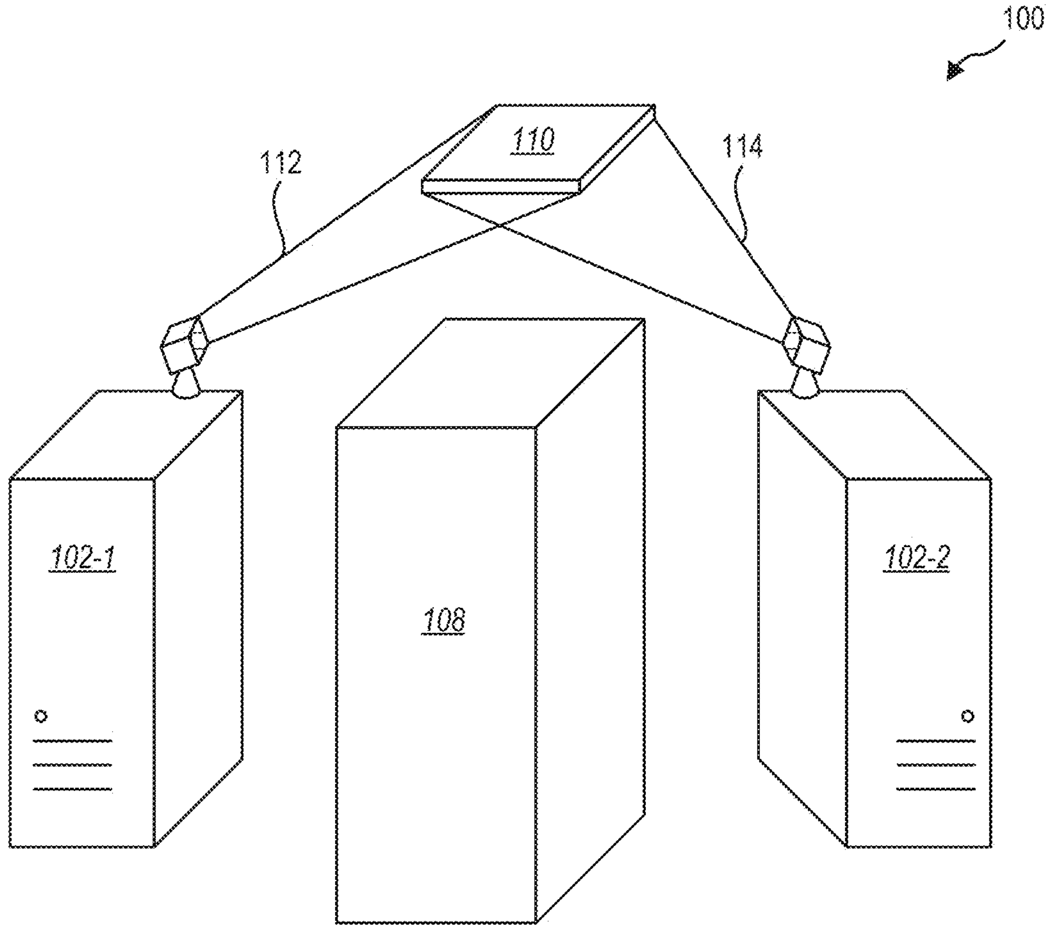
FIG. 1 illustrates a system for communicating spatiotemporal patterns in a datacenter or other computing location, according to at least some embodiments of the present disclosure.

The present disclosure relates generally to systems and methods for communicating data between computing devices. More particularly, the present disclosure relates to communicating data encoded in spatiotemporal patterns between computing devices. In some embodiments, a repeater device is positioned optically between a transmitter and a receiver to communicate data therebetween. In some embodiments, the repeater device is configured and positioned to repeat, amplify, modify, correct, or combinations thereof the spatiotemporal pattern received from the transmitter and broadcast to the receiver.

In a conventional computing system using optical communications, mirror, screens, and other optical communication surfaces direct optical signals between computing devices. However, mirrors and other passive optical communication surfaces can distort an optical signal and are susceptible to dust, dirt, and other contamination of the surface. Additionally, the brightness or intensity of the relayed optical signal is no more than the input signal received at the surface. For example, the brightness of an optical signal in ambient atmosphere may decrease exponentially with distance, limiting the transmission efficiency and affecting the signal to noise ratio of the transmission. Additionally, a mirror or other passive communication surfaces are susceptible to spatial misalignment of the transmitter and/or receiver relative to the surface. A passive communication surface will only communicate the optical signal when the transmitter of the source signal is active, and because the transmitter must transmit with sufficient power to ensure the signal reaches the receiver, the power consumption of the transmitter is exponentially increased. If the receiver is not actively imaging the passive optical communication surface while the transmitter is transmitting, the entire signal can be lost or dropped.

In some embodiments, a repeater device is an active emitter that can receive an input spatiotemporal pattern and emit an output spatiotemporal pattern that is the same as or based at least partially on the input spatiotemporal pattern. In some embodiments, the output spatiotemporal pattern is substantially the same as the input spatiotemporal pattern. For example, the repeater device may receive an input spatiotemporal pattern as transmitted by a transmitter and emit an output spatiotemporal pattern to a receiver as though the receiver received the original input spatiotemporal pattern. In some embodiments, the output spatiotemporal pattern is different from the input spatiotemporal pattern. For example, the output spatiotemporal pattern may have additional information encoded in the output spatiotemporal pattern, such as header information, an additional data channel (e.g., color channel), or different encoding than the input spatiotemporal pattern as will be described in more detail herein.

In some embodiments, the repeater device receives an input spatiotemporal pattern at an input brightness and emits an output spatiotemporal pattern at an output intensity (e.g., brightness) that is greater than the input intensity (e.g., brightness). For example, emitting the output spatiotemporal pattern at the greater brightness may extend the transmission range of the spatiotemporal communication system. In other examples, the repeater device may allow the use of a relatively low-power transmitter generating the spatiotemporal pattern in a longer-range spatiotemporal communication systems. For example, the original transmitter may lack the power to transmit a spatiotemporal pattern across a larger datacenter than was originally intended, and an active repeater according to some embodiments of the present disclosure may amplify the input spatiotemporal pattern.

In some embodiments, the repeater device modifies at least a portion of the input spatiotemporal pattern when emitting the output spatiotemporal pattern. In some embodiments, the output spatiotemporal pattern has a different resolution than the input spatiotemporal pattern. In some embodiments, the input spatiotemporal pattern has a first set of colors in the pattern (e.g., white and black corresponding to "on" and "off") and the output spatiotemporal pattern has a second set of colors (e.g., red and blue). The repeater device may change at least one color of the input spatiotemporal pattern based at least partially on optical filters used by the receivers imaging the repeating device.

In some embodiments, the repeater device temporally modifies the input spatiotemporal pattern. For example, the input spatiotemporal pattern may be transmitted to the repeater device and detected by a light receptor array of the repeater device of a first duration (e.g., 5 milliseconds (ms)), and the repeater may emit the output spatiotemporal pattern for a second duration (e.g., 50 ms). In some embodiments, the repeater device delays the emission of the output spatiotemporal pattern. In at least one example, delaying the communication of the spatiotemporal pattern can ensure that various computational tasks in a computing system are synchronized. For example, the repeater device may receive the input spatiotemporal pattern at T=0 ms to T=5 ms and emit the output spatiotemporal pattern at T>5 ms. In such an example, the repeater device may emit the output spatiotemporal pattern for the same duration as the input spatiotemporal pattern was received. In some examples, the repeater device may emit the output spatiotemporal pattern for a longer duration than the input spatiotemporal pattern was received. In some examples, the repeater device may emit the output spatiotemporal pattern for a shorter duration than the input spatiotemporal pattern was received.

In some embodiments, the repeater device receives a plurality of input spatiotemporal patterns. In some embodiments, the repeater device sums the intensity in at least one data channel (e.g., color) of at least one cell of the spatiotemporal patterns. In some embodiments, the repeater device averages the intensity in at least one data channel (e.g., color) of at least one cell of the spatiotemporal patterns.

FIG. 1 illustrates a system 100 for communicating spatiotemporal patterns in a datacenter or other computing location. In some embodiments, the system 100 includes a first computing device 102-1 and a second computing device 102-2 in optical communication with one another. In some embodiments, the first computing device 102-1 and a second computing device 102-2 in optical communication with one another via a transmitter 104 in data communication with the first computing device 102-1 transmitting a spatiotemporal pattern and a receiver 106 in data communication with the second computing device 102-2 receiving and interpreting a spatiotemporal pattern.

In some embodiments, the transmitter 104 includes a projector. In some embodiments, the transmitter 104 includes a light emitting diode (LED) array. In some embodiments, the transmitter 104 includes an organic LED (OLED) array. In some embodiments, the transmitter 104 includes at least one laser. For example, a laser or array of lasers may transmit a spatiotemporal pattern with less dispersion of the optical signal over a distance. The transmitter 104 receives instructions from the first computing device 102-1 to transmit a first spatiotemporal pattern. In some embodiments, the receiver 106 includes a light receptor array or other photoreceptor that images a spatiotemporal pattern for interpretation by the second computing device 102-2.

In some embodiments, an obstruction 108 prevents or limits line of sight between the transmitter 104 and the receiver 106. A repeater device 110 provides a node between the transmitter 104 and the receiver 106 that receives an input spatiotemporal pattern 112 from the transmitter 104 and emits an output spatiotemporal pattern 114 to the receiver 106. It should be understood that while the system 100 is described with the repeater device 110 receiving the input spatiotemporal pattern 112 from the transmitter 104, in some embodiments, the repeater device 110 receives the input spatiotemporal pattern 112 from another repeater device 110 or other node in the optical communication system. For example, the input spatiotemporal pattern 112 received at the repeater device 110 may be an output spatiotemporal pattern 114 of another device. In some embodiments, the transmitter 104 and the receiver 106 have line of sight, and the system 100 includes the repeater device 110 for other benefits, as described herein.

Figures 1, 2:
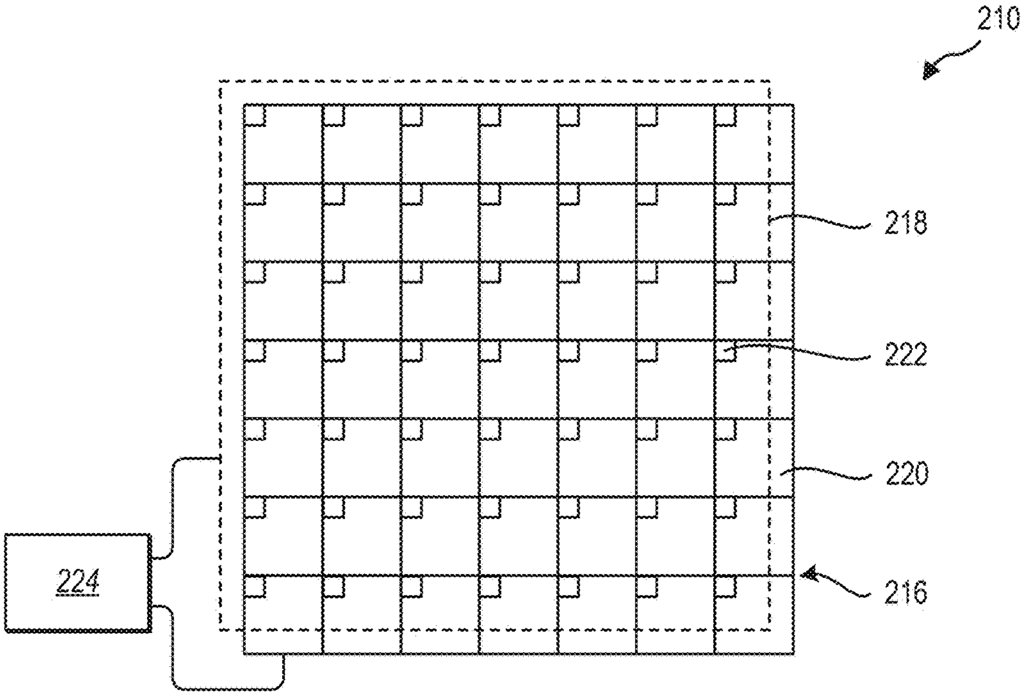
Figure 2:
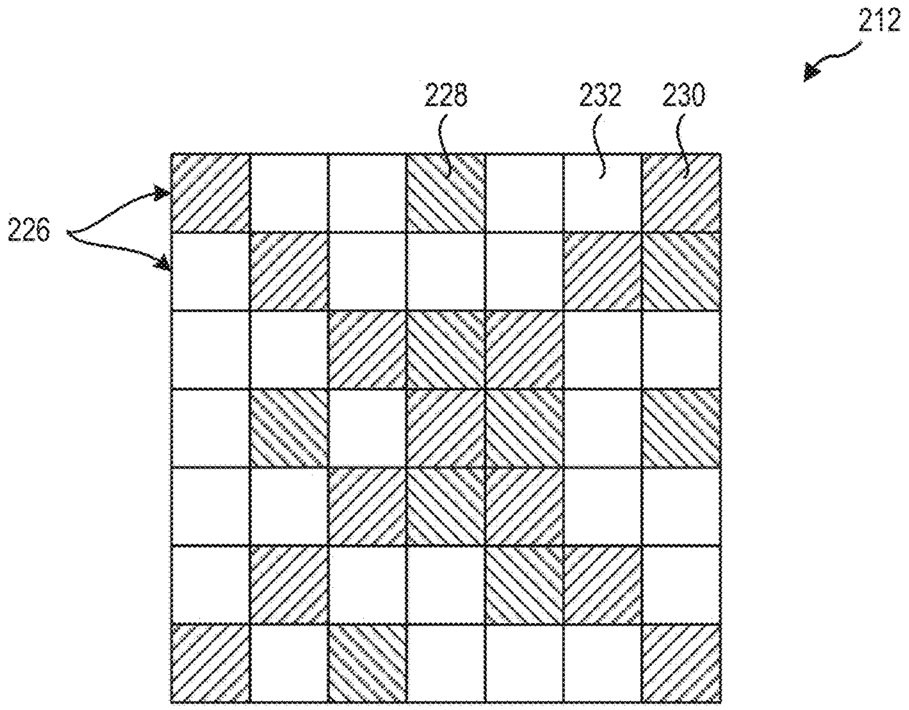

FIG. 2-1 is a plan view of an embodiment of a repeater device 210. In some embodiments, the repeater device 210 includes a light source array 216 and a light receptor array 218. The light source array 216 includes a plurality of light sources 220 configured to emit a spatiotemporal pattern. In some embodiments, a light source 220 includes an LED. In some embodiments, the LED is a microLED. In some embodiments, a light source 220 includes an OLED. In some embodiments, a light source 220 includes at least one laser.

In some embodiments, a light source 220 of the light source array 216 is a 2-state light source. For example, the light source 220 may have two states, such as "on" and "off". In some embodiments, a light source 220 of the light source array 216 is a 3-state light source. For example, the light source 220 may selectively emit two different colors in an "on" state and also have an "off" state. In some embodiments, a light source 220 of the light source array 216 is a continuously variable light source. For example, the light source 220 may include two different diodes capable of emitting different colors of light. The two diodes may be proportionately driven to emit different proportions of light and produce a continuously variable set of colors on a spectrum. In a particular example, a light source 220 includes a red LED and a blue LED that, when driven proportionately, allow the light source 220 to emit any color on a spectrum between red and blue (e.g., purple) at different brightnesses.

In some embodiments, the light receptor array 218 includes a plurality of light receptors 222. The light receptors are configured to detect and/or measure input light to the light receptor array 218. In some embodiments, a light receptor 222 includes a light filter to selectively transmit and/or detect a color channel of light. For example, a light receptor 222 may include a plurality of filters to discern between different color channels of input light. In at least one embodiment, the light receptor array 218 is configured to detect at least two color channels, in addition to detecting no or limited input light from an input spatiotemporal pattern (i.e., an "off" state in the input spatiotemporal pattern).

The light source array 216 and the light receptor array 218 are in electrical communication with one or more repeater controllers 224 that receive the electrical signal from the light receptors 222 of the light receptor array 218 and drive the light sources 220 of the light source array 216 based at least partially on the electrical signals.

In some embodiments, the repeater device 210 includes a plurality of pixels that each include a light receptor 222 and a light source 220. With at least one light receptor 222 and an associated light source 220 positioned together in a pixel, the light source array 216 and the light receptor array 218 may function similar to an actively emitting mirror. A chromatic boost mirror receives a spatiotemporal pattern at the repeater device 210 and re-emits the same or a similar spatiotemporal pattern at the pixels that received the cells of the spatiotemporal pattern.

While the embodiment of FIG. 2-1 is illustrated as the light source array 216 and the light receptor array 218 being co-planar and oriented in the same direction (e.g., receiving and transmitting light normal to the shared plane), it should be understood that in other embodiments, the light source array 216 and the light receptor array 218 are non-planar and/or at least partially oriented in different directions. For example, the light source array 216 and the light receptor array 218 may be positioned on curved surface of a repeater device. In another example, the light source array 216 and the light receptor array 218 may be positioned on different surfaces of the repeater device, such as on adjacent planar surfaces of a hexagonal column in a datacenter. In yet another example, the light source array 216 may be positioned on a first side of the repeater device and the light receptor array 218 may be positioned on a second side of the repeater device opposite from the first side. In such an example, the repeater device may operate as an amplifying "window" that receives an input spatiotemporal pattern at the light receptor array 218 of the second side and transmits the output spatiotemporal pattern from the light source array 216 on the first side to amplify and repeat the signal across long distances.

In some embodiments, the repeater controller(s) 224 change at least one property of the detected input spatiotemporal pattern. For example, the repeater controller(s) 224 may delay the emission of the output spatiotemporal pattern by delaying driving the light sources 220. In some embodiments, the repeater controller(s) 224 changes an output duration from that of the input spatiotemporal pattern by driving the light sources 220 for a different duration. For example, the input spatiotemporal pattern may be detected for a shorter duration than the repeater controller(s) 224 drive the light sources 220 to emit the output spatiotemporal pattern. In some embodiments, the repeater controller(s) 224 may change a color channel of the input spatiotemporal pattern to a different color channel in the output spatiotemporal pattern. For example, an input spatiotemporal pattern may include blue light, while the repeater controller(s) 224 drive the red LED light source 220 based at least partially on the intensity of the received blue light. In some examples, the repeating device 210 may multiplex signals and/or the receiver (e.g., the receiver 106 described in relation to FIG. 1) includes a light filter to selectively detect a particular color channel.

In some embodiments, the repeater controller(s) 224 receives electrical signals from the light receptor(s) 222 corresponding to a plurality of input spatiotemporal patterns, and the repeater controller(s) 224 performs at least one operation on the input spatiotemporal patterns. For example, the repeater controller(s) 224 may multiplex the plurality of input spatiotemporal patterns into different color channels for simultaneous transmission in a multiplexed output spatiotemporal pattern. In some embodiments, the repeater controller(s) 224 combines at least two of the plurality of input spatiotemporal patterns and drives the light sources 220 based at least partially on the combination. In some embodiments, combining the first input spatiotemporal pattern and the second input spatiotemporal pattern includes summing an intensity of each cell 226 of the input spatiotemporal patterns. In some embodiments, combining the first input spatiotemporal pattern and the second input spatiotemporal pattern includes averaging an intensity of each cell 226 of the input spatiotemporal patterns. In some embodiments, combining the first input spatiotemporal pattern and the second input spatiotemporal pattern includes calculating the greater intensity of each cell 226 of the input spatiotemporal patterns and transmitting only one value per cell 226.

FIG. 2-2 is a plan view of an embodiment of an input spatiotemporal pattern 212 that is received and repeated by an embodiment of the repeater device, such as described in relation to FIG. 2-1. In some embodiments, the input spatiotemporal pattern 212 includes a wavelength and intensity in each cell 226. In at least one example, the input spatiotemporal pattern 212 includes one of a first state 228 (e.g., color), a second state 230, and a third state 232 (illustrated in FIG. 2-2 as an "off" state) in each cell. In some embodiments, each color corresponds to a data channel, and the cell 226 may further include an intensity (e.g., brightness) value for each channel. In some embodiments, a cell 226 may include an intensity of a plurality of channels, such as both the first state 228 and the second state 230.

In some embodiments, each light receptor 222 of FIG. 2-1 receives a cell 226 of the input spatiotemporal pattern 212 (e.g., first state 228, second state 230, third state 232). In at least one embodiment, such as a chromatic boost mirror, the repeater controller 224 interprets signal from the light receptor 222 and drives a light source 220 of the light source array 216 to emit an output spatiotemporal pattern that is the same as the input spatiotemporal pattern 212.

In some embodiments, the repeater device 210 emits the same or a similar output spatiotemporal pattern as the input spatiotemporal pattern and at the same intensity (e.g., brightness). In some embodiments, the repeater device 210 emits an output spatiotemporal pattern at a greater intensity than the received input spatiotemporal pattern. In some embodiments, each light source 220 of FIG. 2-1 emits light to produce an output spatiotemporal pattern. In other embodiments, at least one light source 220 of the light source array is not driven based on the input spatiotemporal pattern. For example, a portion of the light receptor array may not detect light of an input spatiotemporal pattern.

In some embodiments, the light receptor array resolution is different from the light source array resolution. In some embodiments, the light receptor array has a different quantity of light receptors than the quantity of light sources in the light source array. For example, each pixel of the repeater device includes more light receptors than light source(s). In some embodiments, the light receptor array resolution is different from the pattern cell resolution. For example, the repeater device may be configured and positioned relative to the transmitter such that a single cell of the input spatiotemporal pattern is detected by a plurality of light receptors. In some embodiments, the light receptor array has an equal quantity of light receptors to the quantity of light sources in the light source array.

Figures 1, 3:
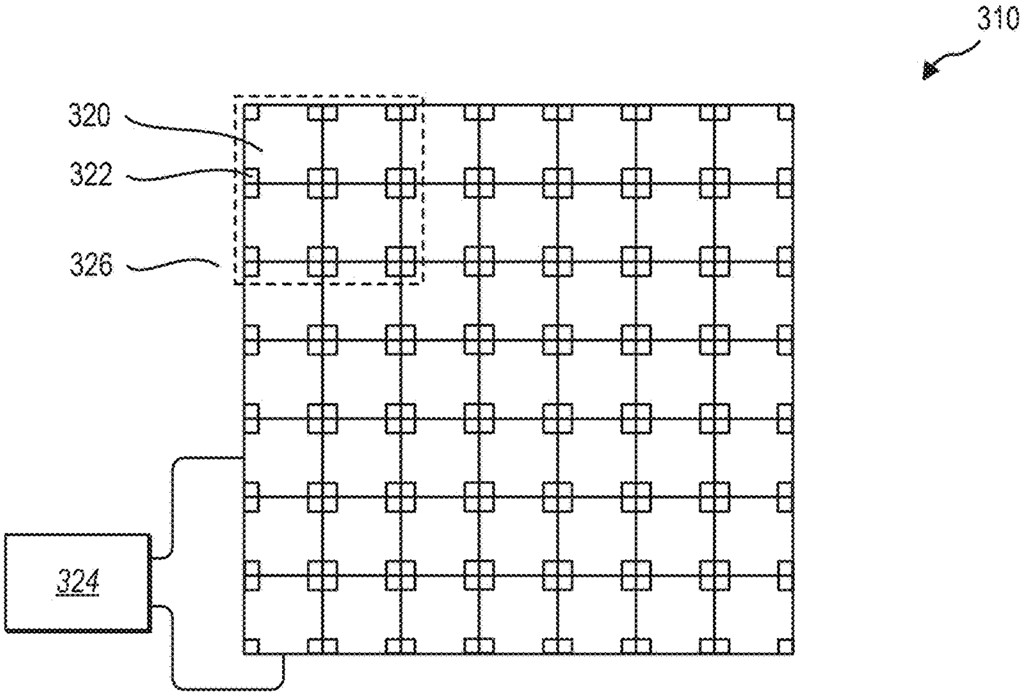
Figures 2, 3:
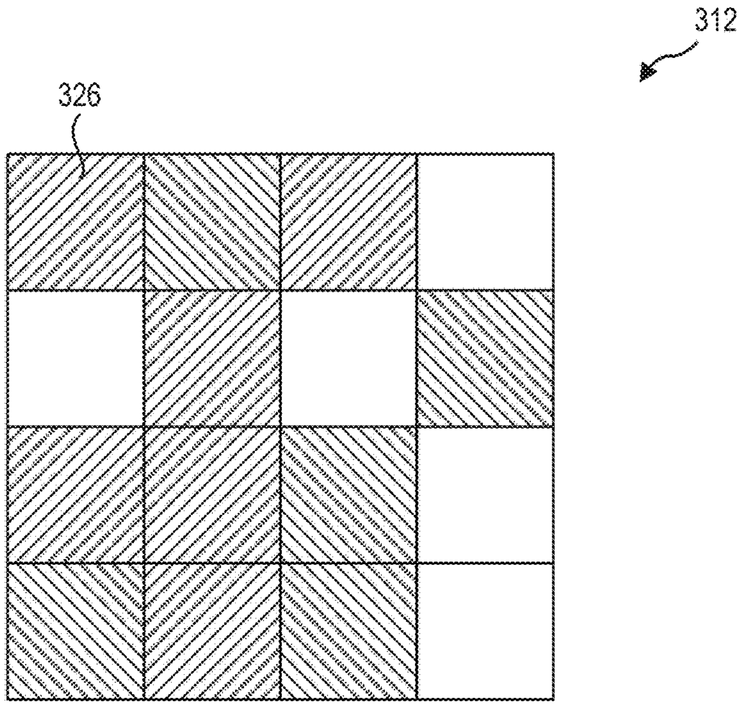

FIG. 3-1 is a plan view of an embodiment of a repeater device 310 with a high-resolution light receptor array relative to the resolution of the light sources 320. FIG. 3-2 is a plan view of an embodiment of an input spatiotemporal pattern 312 that is received and repeated by the embodiment of the repeater device 310 described in relation to FIG. 3-1.

In some embodiments, the cell 326 of the input spatiotemporal pattern 312 is received by more than one light receptor 322 of the plurality of light receptors. In some embodiments, the cell 326 is reproduced by more than one light source 320 of the plurality of light sources.

In some embodiments, the input spatiotemporal pattern 312 impinges on an area of the repeater device 310 that is less than the area of the light receptor array. In such examples, the repeater device 310 is tolerant to spatial misalignments of the transmitter (e.g., transmitter 104 described in relation to FIG. 1) with the repeater device 310, as the repeater device 310 has a light receptor array resolution and light source array resolution to receive, detect, and reproduce (e.g., emit) an output spatiotemporal pattern based at least partially on the input spatiotemporal pattern. It should be understood that the input spatiotemporal pattern and the output spatiotemporal pattern need not be spatially aligned. For example, the input spatiotemporal pattern may impinge upon less than the entire area of the repeater device 310 (e.g., less than the entire area of the light receptor array) and the repeater controller 324 may drive the light sources 320 of the entire light source array to emit the output spatiotemporal pattern larger and/or brighter to improve optical communication.

Figure 4:
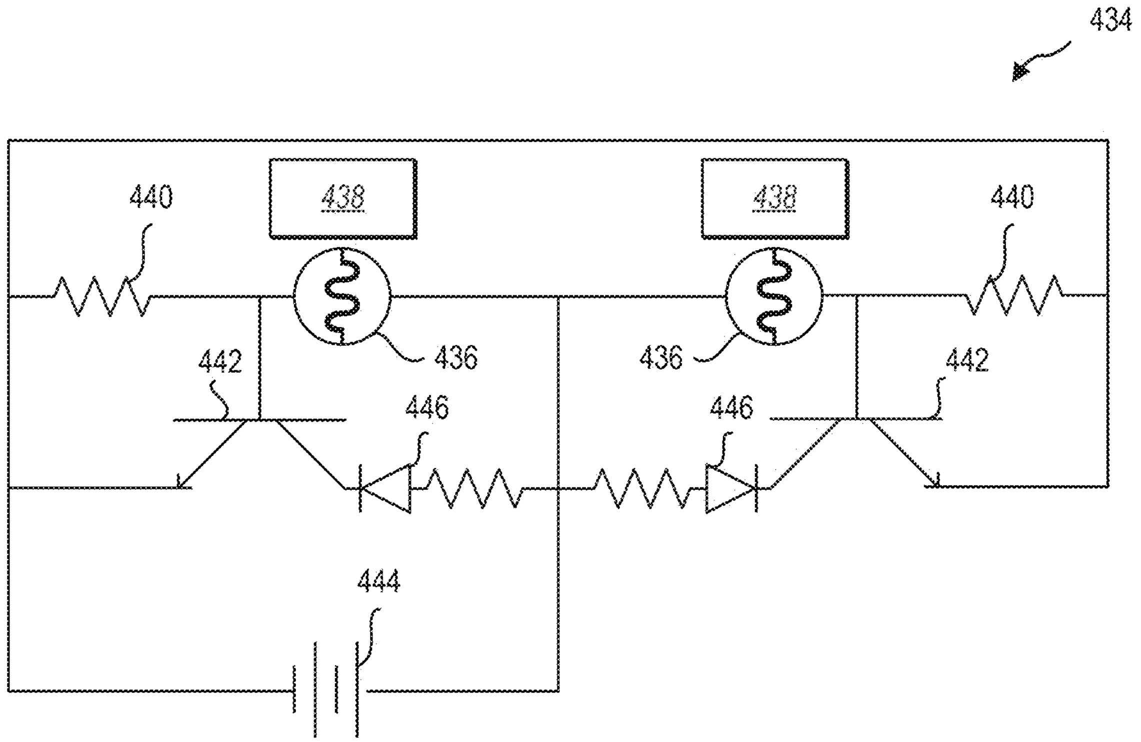
FIG. 4 is a circuit diagram of an embodiment of a repeater pixel and repeater controller, according to at least some embodiments of the present disclosure.

FIG. 4 is a circuit diagram of an embodiment of a repeater pixel and repeater controller 424. In some embodiments, the circuit 434 includes photoresistors 436 with wavelength filters 438 to selectively detect a portion of the input light from the input spatiotemporal pattern. In some embodiments, the photoresistors 436 generate an electrical signal when exposed to light, and the electrical signal (through one or more resistors 440 and/or transistors 442) directs electrical current from a power supply 444 to an LED 446 or other light source.

In some embodiments, the circuit 434 is a competitive circuit. In some embodiments, the circuit drives the LEDs or other light sources proportionately to the light received at a photoresistor or other light receptor. In some embodiments, the circuit drives the LEDs or other light sources mutually exclusive to one another based at least partially on the light received at the photoresistors or other light receptor. In some embodiments, each cell of an input spatiotemporal pattern relates to a value or a portion of a value of a variable. For example, a plurality of spatiotemporal patterns, when directed at a common area, will overlap and combine in intensity. This overlapping summation can allow for the combination of data from the spatiotemporal patterns.

Figure 5:
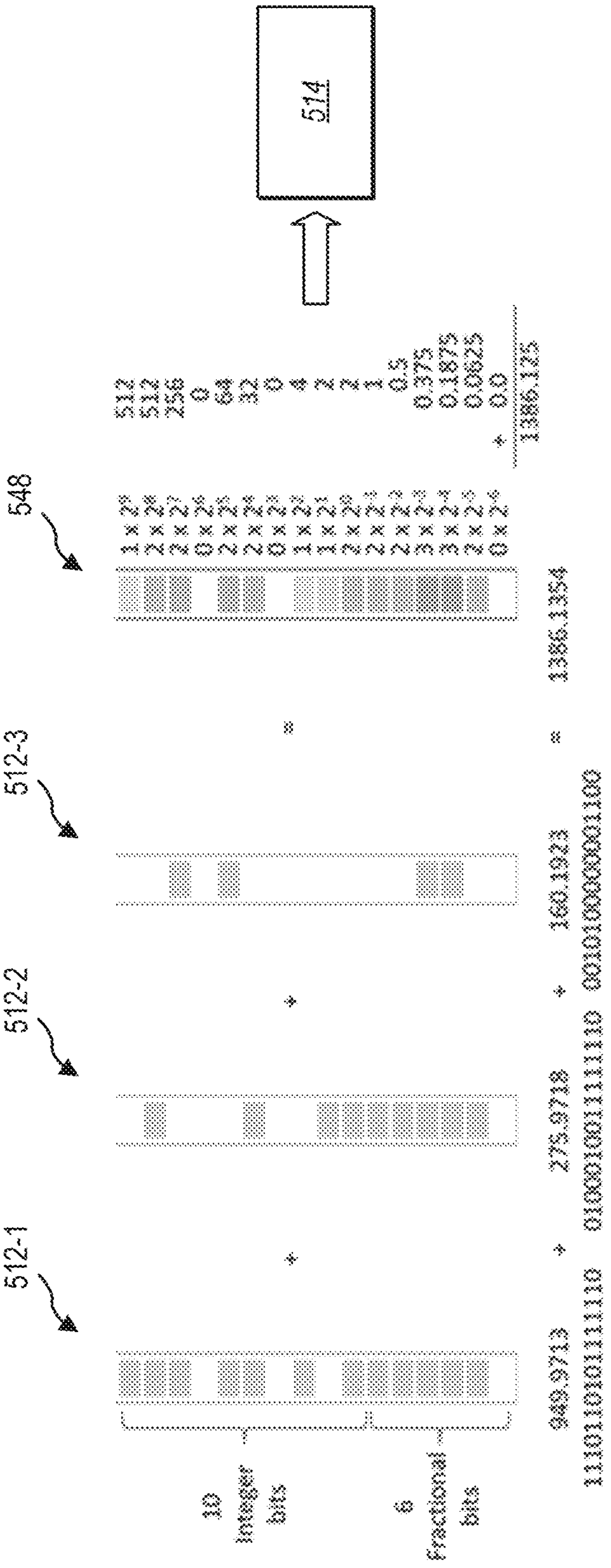
FIG. 5 illustrates combining one-dimensional spatiotemporal patterns, according to at least some embodiments of the present disclosure.

FIG. 5 is an embodiment of combining spatiotemporal patterns. A plurality of spatiotemporal patterns each have an intensity value in a cell that is associated with a portion of a numerical value. For example, each spatiotemporal pattern in FIG. 5 is a numerical value that is encoded into a 16-bit binary pattern. Each of the first input spatiotemporal pattern 512-1, the second input spatiotemporal pattern 512-2, and the third input spatiotemporal pattern 512-3 have cells corresponding to portions of the numeral value. When overlaid, the intensities of the pattern in each cell sum together, and the overlaid spatiotemporal pattern 548 has an intensity of each cell that can be measured by the light receptors of a repeater device to communicate the summed value of the input spatiotemporal patterns. In some embodiments, the combination of the input spatiotemporal patterns is transmitted as the output spatiotemporal pattern 514 from the repeater device.

In a conventional optical communication system, overlaid or simultaneous spatiotemporal patterns are combined at each receiver or receiving computing device. In systems with a plurality of receiving computing devices (such as the second computing device(s) 102-2 described in relation to FIG. 1), combining the input spatiotemporal patterns and emitting an output spatiotemporal pattern 514 to a receiver or plurality of receivers (such as the receiver 106 described in relation to FIG. 1) offloads the summation or other combination operations to the repeater device instead of redundant operations on the plurality of receiving computing devices.

Figures 1, 6:
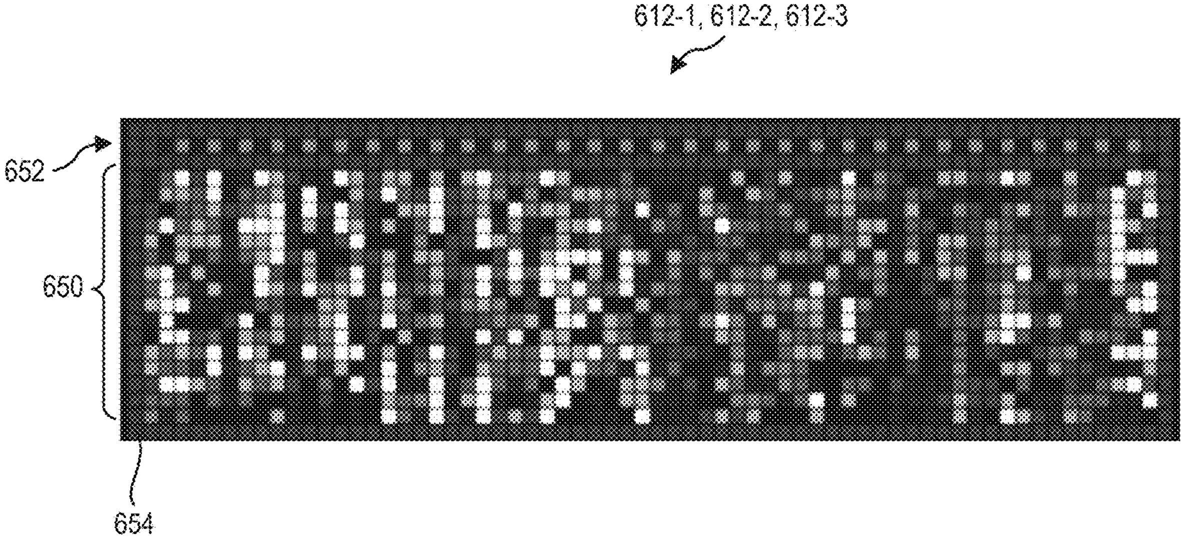
Figures 2, 6:
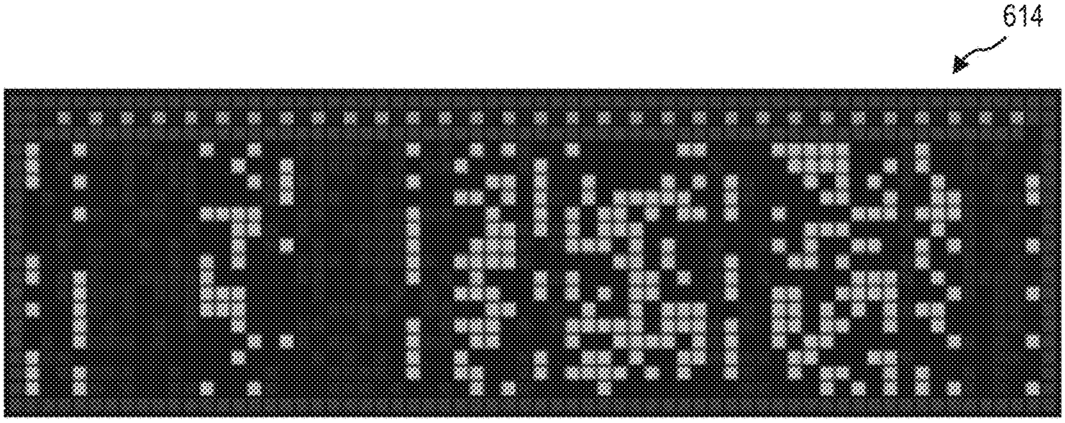

FIG. 6-1 illustrates overlapping or overlaid input spatiotemporal patterns 612-1, 612-2, 612-3 received at repeater device, according to some embodiment of the present disclosure. In some embodiments, the overlaid input spatiotemporal patterns 612-1, 612-2, 612-3 include body cells 650 with information encoded therein. For example, each column of the body cells 650 illustrated in FIG. 6-1 and FIG. 6-2 may be a 16-bit value such as described in relation to FIG. 5. In some embodiments, the overlaid input spatiotemporal patterns 612-1, 612-2, 612-3 include additional information to confirm spatial and/or temporal alignment, such as header information 652 and/or border information 652 or other alignment cells.

In some embodiments, the intensity of the data channel (e.g., color channel) at each cell of the body cells 650 is summed, such as described in relation to FIG. 5. In some embodiments, the intensity of each data channel at each cell is compared against other data channels and/or against a threshold value to determine a single value of the combined output spatiotemporal pattern 614 illustrated in FIG. 6-2. For example, the repeater controller may compare the intensity of a red data channel to an intensity of a blue data channel at particular cell and, upon determining the red intensity to be greater, drive the red LED of the corresponding pixel in the output spatiotemporal pattern 614. In some examples, the repeater controller may compare the intensity of a red data channel to threshold value at particular cell and, upon determining the red intensity to be below the threshold value, not drive the red LED of the corresponding pixel in the output spatiotemporal pattern 614 to communicate an "off" state.

In some embodiments, combining the overlaid input spatiotemporal patterns 612-1, 612-2, 612-3 includes averaging the intensity of a data channel at a particular cell. For example, the overlaid input spatiotemporal patterns 612-1, 612-2, 612-3 may sum to an intensity of 1.8 for a given cell of the body cells 650. In some embodiments, the repeater controller may receive the header information 652 (via the photoreceptors) and determine the presence of three concurrent overlaid input spatiotemporal patterns 612-1, 612-2, 612-3. As the measured intensity of the particular cell is the summed intensity, averaging the intensity may include dividing the measured intensity by the quantity of concurrent overlaid input spatiotemporal patterns 612-1, 612-2, 612-3 according to the header information 652.

The alignment information 654 may be a border, a pattern, spacers or other recognizable cells in the input spatiotemporal patterns 612-1, 612-2, 612-3 that the repeater controller can use to shift the input spatiotemporal patterns 612-1, 612-2, 612-3 relative to one another to properly align the input spatiotemporal patterns 612-1, 612-2, 612-3. For example, the first input spatiotemporal pattern 612-1 and second input spatiotemporal pattern 612-2 may impinge upon the light receptor array already aligned, while the third input spatiotemporal pattern 612-3 may exhibit the same alignment information 652 measured at different locations in the light receptor array. In some embodiments, the repeater controller shifts, rotates, displaces, or otherwise transforms the third input spatiotemporal pattern 612-3 to align with the first input spatiotemporal pattern 612-1 and second input spatiotemporal pattern 612-2. In some embodiments, the repeater controller reports an error to a user to inform the user of the spatial misalignment.

Figure 7:
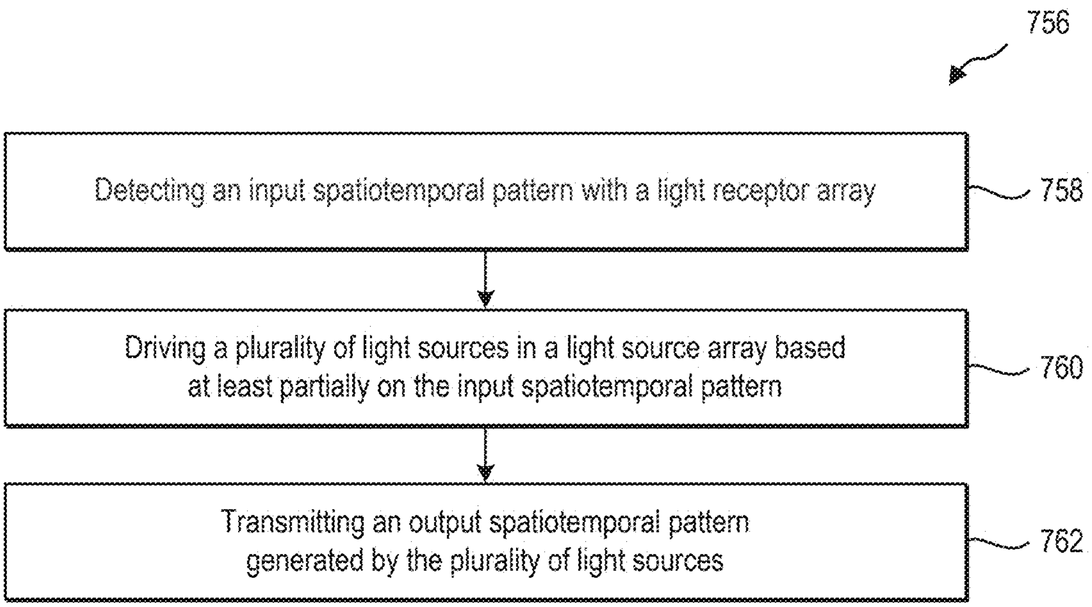
FIG. 7 is a flowchart illustrating a method of communicating spatiotemporal patterns, according to at least some embodiments of the present disclosure.

FIG. 7 is a flowchart illustrating a method 756 of communicating spatiotemporal patterns, according to some embodiments of the present disclosure. In some embodiments, the method 756 includes detecting an input spatiotemporal pattern with a light receptor array of a repeater device at 758, such as embodiment of a light receptors described at least in relation to FIG. 2 through FIG. 4. Detecting the input spatiotemporal pattern may include communicating an electrical signal from the light receptor(s) to a repeater controller of the repeater device as described at least in relation to FIG. 2 through FIG. 4 (e.g., the circuit of FIG. 4 is a repeater controller of the simplifier repeater circuit described therein).

In some embodiments, the method 756 further includes driving a plurality of light sources in a light source array of the repeater device based at least partially on the input spatiotemporal pattern at 760 and transmitting an output spatiotemporal pattern generated by the plurality of light sources at 762. In some embodiments, the output spatiotemporal pattern is substantially the same as the input spatiotemporal pattern. For example, the repeater device may receive an input spatiotemporal pattern as transmitted by a transmitter and emit an output spatiotemporal pattern to a receiver as though the receiver received the original input spatiotemporal pattern. In some embodiments, the output spatiotemporal pattern is different from the input spatiotemporal pattern. For example, the output spatiotemporal pattern may have additional information encoded in the output spatiotemporal pattern, such as header information, an additional data channel (e.g., color channel), or different encoding than the input spatiotemporal pattern as will described in more detail herein.

In some embodiments, the repeater device receives an input spatiotemporal pattern at an input brightness and emits an output spatiotemporal pattern at an output intensity (e.g., brightness) that is greater than the input intensity (e.g., brightness). For example, emitting the output spatiotemporal pattern at the greater brightness may extend the transmission range of the spatiotemporal communication system. In other examples, the repeater device may allow the use of a relatively low-power transmitter generating the spatiotemporal pattern in a longer-range spatiotemporal communication system. For example, the original transmitter may lack the power to transmit a spatiotemporal pattern across a larger datacenter than was originally intended, and an active repeater according to some embodiments of the present disclosure may amplify the input spatiotemporal pattern.

In some embodiments, the repeater device modifies at least a portion of the input spatiotemporal pattern when emitting the output spatiotemporal pattern. In some embodiments, the output spatiotemporal pattern has a different resolution than the input spatiotemporal pattern. In some embodiments, the input spatiotemporal pattern has a first set of colors in the pattern (e.g., white and black corresponding to "on" and "off") and the output spatiotemporal pattern has a second set of colors (e.g., red and blue). The repeater device may change at least one color of the input spatiotemporal pattern based at least partially on optical filters used by the receivers imaging the repeating device.

In some embodiments, the repeater device temporally modifies the input spatiotemporal pattern. For example, the input spatiotemporal pattern may be transmitted to the repeater device and detected by a light receptor array of the repeater device of a first duration (e.g., 5 ms), and the repeater may emit the output spatiotemporal pattern for a second duration (e.g., 50 ms). In some embodiments, the repeater device delays the emission of the output spatiotemporal pattern by a delay duration after detecting the input spatiotemporal pattern. In some embodiments, the delay duration begins after detecting the input spatiotemporal pattern begins. For example, a 5 ms delay duration causes the repeater controller to begin driving the light sources 5 ms after the input spatiotemporal pattern is initially detected. In some embodiments, the delay duration begins after detecting the input spatiotemporal pattern ends. For example, a 5 ms delay duration causes the repeater controller to begin driving the light sources 5 ms after the input spatiotemporal pattern is no longer detected. In at least one example, delaying the communication of the spatiotemporal pattern can ensure that various computational tasks in a computing system are synchronized. For example, the repeater device may receive the input spatiotemporal pattern at T=0 ms to T=5 ms and emit the output spatiotemporal pattern at T>5 ms.

In some embodiments, the repeater controller drives the plurality of light sources to transmit the output spatiotemporal pattern for the same output duration as an input duration of the input spatiotemporal pattern. In some examples, the repeater device may emit the output spatiotemporal pattern for a longer output duration than the input duration of the input spatiotemporal pattern. In some examples, the repeater device may emit the output spatiotemporal pattern for a shorter output duration than the input duration of the input spatiotemporal pattern.

In some embodiments, the repeater controller continues to drive the plurality of lights sources and/or transmit the output spatiotemporal pattern indefinitely. In some embodiments, the repeater controller continues to drive the plurality of lights sources and/or transmit the output spatiotemporal pattern until a termination signal is received. In some embodiments, the termination signal includes detecting any other input spatiotemporal pattern. In some embodiments, the termination signal may be detected in the header information of another input spatiotemporal pattern (allowing the repeater device to ignore input spatiotemporal patterns that lack a termination signal). In some embodiments, the termination signal may be received through a different communication device or pathway than the light receptor(s) of the repeater device. For example, the repeater device may include or be in data communication with a radio-frequency transceiver through which the termination signal may be received. In at least one embodiment, transmitting the output spatiotemporal pattern indefinitely may allow any receivers in optical communication with the repeater device to access the output spatiotemporal pattern as needed. The repeater device may, in such examples, operate as spatiotemporal memory in the computing system.

It should be understood that while the present disclosure describes the repeater controller driving the light sources, the repeater controller may drive the light sources by activating or instructing another component of the electrical circuit to drive the light source(s). For example, driving the light source may include the repeater controller instructing a power supply to drive the light source, such as via a transistor of the drive circuit of the light source.

In some embodiments, the repeater device receives a plurality of input spatiotemporal patterns. In some embodiments, the intensity of the data channel (e.g., color channel) at each cell of the body cells is summed, such as described in relation to FIG. 5. In some embodiments, the intensity of each data channel at each cell is compared against other data channels and/or against a threshold value to determine a single value of the combined output spatiotemporal pattern illustrated in FIG. 6-2. For example, the repeater controller may compare the intensity of a red data channel to an intensity of a blue data channel at particular cell and, upon determining the red intensity to be greater, drive the red LED of the corresponding pixel in the output spatiotemporal pattern. In some examples, the repeater controller may compare the intensity of a red data channel to threshold value at particular cell and, upon determining the red intensity to be below the threshold value, not drive the red LED of the corresponding pixel in the output spatiotemporal pattern to communicate an "off" state.

In some embodiments, combining the overlaid input spatiotemporal patterns includes averaging the intensity of a data channel at a particular cell. For example, the overlaid input spatiotemporal patterns may sum to an intensity of 1.8 for a given cell of the body cells. In some embodiments, the repeater controller may receive the header information (via the photoreceptors) and determine the presence of three concurrent overlaid input spatiotemporal patterns. As the measured intensity of the particular cell is the summed intensity, averaging the intensity may include dividing the measured intensity by the quantity of concurrent overlaid input spatiotemporal patterns according to the header information.

In some embodiments, combining the overlaid spatiotemporal patterns includes aligning the spatiotemporal patterns. The alignment information may be a border, a pattern, spacers or other recognizable cells in the input spatiotemporal patterns that the repeater controller can use to shift the input spatiotemporal patterns relative to one another to properly align the input spatiotemporal patterns. For example, the first input spatiotemporal pattern and second input spatiotemporal pattern may impinge upon the light receptor array already aligned, while the third input spatiotemporal pattern may exhibit the same alignment information measured at different locations in the light receptor array. In some embodiments, the repeater controller shifts, rotates, displaces, or otherwise transforms the third input spatiotemporal pattern to align with the first input spatiotemporal pattern and second input spatiotemporal pattern. In some embodiments, the repeater controller reports an error to a user to inform the user of the spatial misalignment.

INDUSTRIAL APPLICABILITY

The present disclosure relates generally to systems and methods for communicating data between computing devices. More particularly, the present disclosure relates to communicating data encoded in spatiotemporal patterns between computing devices. In some embodiments, a repeater device is positioned optically between a transmitter and a receiver to communicate data therebetween. In some embodiments, the repeater device is configured and positioned to repeat, amplify, modify, correct, or combinations thereof the spatiotemporal pattern received from the transmitter and broadcast to the receiver.

In a conventional computing system using optical communications, mirror, screens, and other optical communication surfaces direct optical signals between computing devices. However, mirrors and other passive optical communication surfaces can distort an optical signal and are susceptible to dust, dirt, and other contamination of the surface. Additionally, the brightness or intensity of the relayed optical signal is no more than the input signal received at the surface. For example, the brightness of an optical signal in ambient atmosphere may decrease exponentially with distance, limiting the transmission efficiency and affecting the signal to noise ratio of the transmission. Additionally, a mirror or other passive communication surfaces are susceptible to spatial misalignment of the transmitter and/or receiver relative to the surface. A passive communication surface will only communicate the optical signal when the transmitter of the source signal is active, and because the transmitter must transmit with sufficient power to ensure the signal reaches the receiver, the power consumption of the transmitter is exponentially increased. If the receiver is not actively imaging the passive optical communication surface while the transmitter is transmitting, the entire signal can be lost or dropped.

In some embodiments, a repeater device is an active emitter that can receive an input spatiotemporal pattern and emit an output spatiotemporal pattern that is the same as or based at least partially on the input spatiotemporal pattern. In some embodiments, the output spatiotemporal pattern is substantially the same as the input spatiotemporal pattern. For example, the repeater device may receive an input spatiotemporal pattern as transmitted by a transmitter and emit an output spatiotemporal pattern to a receiver as though the receiver received the original input spatiotemporal pattern. In some embodiments, the output spatiotemporal pattern is different from the input spatiotemporal pattern. For example, the output spatiotemporal pattern may have additional information encoded in the output spatiotemporal pattern, such as header information, an additional data channel (e.g., color channel), or different encoding than the input spatiotemporal pattern as will described in more detail herein.

In some embodiments, the repeater device receives an input spatiotemporal pattern at an input brightness and emits an output spatiotemporal pattern at an output intensity (e.g., brightness) that is greater than the input intensity (e.g., brightness). For example, emitting the output spatiotemporal pattern at the greater brightness may extend the transmission range of the spatiotemporal communication system. In other examples, the repeater device may allow the use of a relatively low-power transmitter generating the spatiotemporal pattern in a longer-range spatiotemporal communication systems. For example, the original transmitter may lack the power to transmit a spatiotemporal pattern across a larger datacenter than was originally intended, and an active repeater according to some embodiments of the present disclosure may amplify the input spatiotemporal pattern.

In some embodiments, the repeater device modifies at least a portion of the input spatiotemporal pattern when emitting the output spatiotemporal pattern. In some embodiments, the output spatiotemporal pattern has a different resolution than the input spatiotemporal pattern. In some embodiments, the input spatiotemporal pattern has a first set of colors in the pattern (e.g., white and black corresponding to "on" and "off") and the output spatiotemporal pattern has a second set of colors (e.g., red and blue). The repeater device may change at least one color of the input spatiotemporal pattern based at least partially on optical filters used by the receivers imaging the repeating device.

In some embodiments, the repeater device temporally modifies the input spatiotemporal pattern. For example, the input spatiotemporal pattern may be transmitted to the repeater device and detected by a light receptor array of the repeater device of a first duration (e.g., 5 milliseconds (ms)), and the repeater may emit the output spatiotemporal pattern for a second duration (e.g., 50 ms). In some embodiments, the repeater device delays the emission of the output spatiotemporal pattern. In at least one example, delaying the communication of the spatiotemporal pattern can ensure that various computational tasks in a computing system are synchronized. For example, the repeater device may receive the input spatiotemporal pattern at T=0 ms to T=5 ms and emit the output spatiotemporal pattern at T>5 ms. In such an example, the repeater device may emit the output spatiotemporal pattern for the same duration as the input spatiotemporal pattern was received. In some examples, the repeater device may emit the output spatiotemporal pattern for a longer duration than the input spatiotemporal pattern was received. In some examples, the repeater device may emit the output spatiotemporal pattern for a shorter duration than the input spatiotemporal pattern was received.

In some embodiments, the repeater device receives a plurality of input spatiotemporal patterns. In some embodiments, the repeater device sums the intensity in at least one data channel (e.g., color) of at least one cell of the spatiotemporal patterns. In some embodiments, the repeater device averages the intensity in at least one data channel (e.g., color) of at least one cell of the spatiotemporal patterns.

In some embodiments, a system for optical communications includes a first computing device and a second computing device in optical communication with one another. In some embodiments, the first computing device and a second computing device in optical communication with one another via a transmitter in data communication with the first computing device transmitting a spatiotemporal pattern and a receiver in data communication with the second computing device receiving and interpreting a spatiotemporal pattern.

In some embodiments, the transmitter includes a projector. In some embodiments, the transmitter includes a light emitting diode (LED) array. In some embodiments, the transmitter includes an organic LED (OLED) array. In some embodiments, the transmitter includes at least one laser. For example, a laser or array of lasers may transmit a spatiotemporal pattern with less dispersion of the optical signal over a distance. The transmitter receives instructions from the first computing device to transmit a first spatiotemporal pattern. In some embodiments, the receiver includes a light receptor array or other photoreceptor that images a spatiotemporal pattern for interpretation by the second computing device.

In some embodiments, an obstruction prevents or limits line of sight between the transmitter and the receiver. A repeater device provides a node between the transmitter and the receiver that receives an input spatiotemporal pattern from the transmitter and emits an output spatiotemporal pattern to the receiver. It should be understood that while the system is described with the repeater device receiving the input spatiotemporal pattern from the transmitter, in some embodiments, the repeater device receives the input spatiotemporal pattern from another repeater device or other node in the optical communication system. For example, the input spatiotemporal pattern received at the repeater device may be an output spatiotemporal pattern of another device. In some embodiments, the transmitter and the receiver have line of sight, and the system includes the repeater device for other benefits, as described herein.

In some embodiments, the repeater device includes a light source array and a light receptor array. The light source array includes a plurality of light sources configured to emit a spatiotemporal pattern. In some embodiments, a light source includes an LED. In some embodiments, a light source includes an OLED. In some embodiments, a light source includes at least one laser.

In some embodiments, a light source of the light source array is a 2-state light source. For example, the light source may have two states, such as "on" and "off". In some embodiments, a light source of the light source array is a 3-state light source. For example, the light source may selectively emit two different colors in an "on" state and also have an "off" state. In some embodiments, a light source of the light source array is a continuously variable light source. For example, the light source may include two different diodes capable of emitting different colors of light. The two diodes may be proportionately driven to emit different proportions of light and produce a continuously variable set of colors on a spectrum. In a particular example, a light source includes a red LED and a blue LED that, when driven proportionately, allow the light source to emit any color on a spectrum between red and blue (e.g., purple) at different brightnesses.

In some embodiments, the light receptor array includes a plurality of light receptors. The light receptors are configured to detect and/or measure input light to the light receptor array. In some embodiments, a light receptor includes a light filter to selectively transmit and/or detect a color channel of light. For example, a light receptor may include a plurality of filters to discern between different color channels of input light. In at least one embodiment, the light receptor array is configured to detect at least two color channels, in addition to detecting no or limited input light from an input spatiotemporal pattern (i.e., an "off" state in the input spatiotemporal pattern).

The light source array and the light receptor array are in electrical communication with one or more repeater controllers that receive the electrical signal from the light receptors of the light receptor array and drive the light sources of the light source array based at least partially on the electrical signals.

In some embodiments, the repeater device includes a plurality of pixels that each include a light receptor and a light source. With at least one light receptor and an associated light source positioned together in a pixel, the light source array and the light receptor array may function similar to an actively emitting mirror. A chromatic boost mirror receives a spatiotemporal pattern at the repeater device and re-emits the same or a similar spatiotemporal pattern at the pixels that received the cells of the spatiotemporal pattern.

In some embodiments, the light source array and the light receptor array are non-planar and/or at least partially oriented in different directions. For example, the light source array and the light receptor array may be positioned on curved surface of a repeater device. In another example, the light source array and the light receptor array may be positioned on different surfaces of the repeater device, such as on adjacent planar surfaces of a hexagonal column in a datacenter. In yet another example, the light source array may be positioned on a first side of the repeater device and the light receptor array may be positioned on a second side of the repeater device opposite from the first side. In such an example, the repeater device may operate as an amplifying "window" that receives an input spatiotemporal pattern at the light receptor array of the second side and transmits the output spatiotemporal pattern from the light source array on the first side to amplify and repeat the signal across long distances.

In some embodiments, the repeater controller(s) change at least one property of the detected input spatiotemporal pattern. For example, the repeater controller(s) may delay the emission of the output spatiotemporal pattern by delaying driving the light sources. In some embodiments, the repeater controller(s) change an output duration from that of the input spatiotemporal pattern by driving the light sources for a different duration. For example, the input spatiotemporal pattern may be detected for a shorter duration than the repeater controller(s) drive the light sources to emit the output spatiotemporal pattern. In some embodiments, the repeater controller(s) may change a color channel of the input spatiotemporal pattern to a different color channel in the output spatiotemporal pattern. For example, an input spatiotemporal pattern may include blue light, while the repeater controller(s) drive the red LED light source based at least partially on the intensity of the received blue light. In some examples, the repeating device may multiplex signals and/or the receiver includes a light filter to selectively detect a particular color channel.

In some embodiments, the repeater controller(s) receives electrical signals from the light receptor(s) corresponding to a plurality of input spatiotemporal patterns, and the repeater controller(s) performs at least one operation on the input spatiotemporal patterns. For example, the repeater controller(s) may multiplex the plurality of input spatiotemporal patterns into different color channels for simultaneous transmission in a multiplexed output spatiotemporal pattern. In some embodiments, the repeater controller(s) combines at least two of the plurality of input spatiotemporal patterns and drives the light sources based at least partially on the combination. In some embodiments, combining the first input spatiotemporal pattern and the second input spatiotemporal pattern includes summing an intensity of each cell of the input spatiotemporal patterns. In some embodiments, combining the first input spatiotemporal pattern and the second input spatiotemporal pattern includes averaging an intensity of each cell of the input spatiotemporal patterns. In some embodiments, combining the first input spatiotemporal pattern and the second input spatiotemporal pattern includes calculating the greater intensity of each cell of the input spatiotemporal patterns and transmitting only one value per cell.

In some embodiments, the input spatiotemporal pattern includes a wavelength and intensity in each cell. In at least one example, the input spatiotemporal pattern includes one of a first state, a second state, and a third state in each cell. In some embodiments, each color corresponds to a data channel, and the cell may further include an intensity (e.g., brightness) value for each channel. In some embodiments, a cell may include an intensity of a plurality of channels, such as both the first state and the second state.

In some embodiments, each light receptor receives a cell of the input spatiotemporal pattern. In at least one embodiment, such as a chromatic boost mirror, the repeater controller interprets signal from the light receptor and drives a light source of the light source array to emit an output spatiotemporal pattern that is the same as the input spatiotemporal pattern.

In some embodiments, the repeater device emits the same or a similar output spatiotemporal pattern as the input spatiotemporal pattern and at the same intensity (e.g., brightness). In some embodiments, the repeater device emits an output spatiotemporal pattern at a greater intensity than the received input spatiotemporal pattern. In some embodiments, each light source of the light source array emits light to produce an output spatiotemporal pattern. In other embodiments, at least one light source of the light source array is not driven based on the input spatiotemporal pattern. For example, a portion of the light receptor array may not detect light of an input spatiotemporal pattern.

In some embodiments, the light receptor array resolution is different from the light source array resolution. In some embodiments, the light receptor array has a different quantity of light receptors than the quantity of light sources in the light source array. For example, each pixel of the repeater device includes more light receptors than light source(s). In some embodiments, the light receptor array resolution is different from the pattern cell resolution. For example, the repeater device may be configured and positioned relative to the transmitter such that a single cell of the input spatiotemporal pattern is detected by a plurality of light receptors. In some embodiments, the light receptor array has an equal quantity of light receptors to the quantity of light sources in the light source array.

In some embodiments, the cell of the input spatiotemporal pattern is received by more than one light receptor of the plurality of light receptors. In some embodiments, the cell is reproduced by more than one light source of the plurality of light sources.

In some embodiments, the input spatiotemporal pattern impinges on an area of the repeater device that is less than the area of the light receptor array. In such examples, the repeater device is tolerant to spatial misalignments of the transmitter with the repeater device, as the repeater device has a light receptor array resolution and light source array resolution to receive, detect, and reproduce (e.g., emit) an output spatiotemporal pattern based at least partially on the input spatiotemporal pattern. It should be understood that the input spatiotemporal pattern and the output spatiotemporal pattern need not be spatially aligned. For example, the input spatiotemporal pattern may impinge upon less than the entire area of the repeater device (e.g., less than the entire area of the light receptor array) and the repeater controller may drive the light sources of the entire light source array to emit the output spatiotemporal pattern larger and/or brighter to improve optical communication.

In some embodiments, a plurality of spatiotemporal patterns each have an intensity value in a cell that is associated with a portion of a numerical value. For example, each spatiotemporal pattern is a numerical value that is encoded into a 16-bit binary pattern. Each of the first input spatiotemporal pattern, the second input spatiotemporal pattern, and the third input spatiotemporal pattern have cells corresponding to portions of the numeral value. When overlaid, the intensities of the pattern in each cell sum together, and the overlaid spatiotemporal pattern has an intensity of each cell that can be measured by the light receptors of a repeater device to communicate the summed value of the input spatiotemporal patterns. In some embodiments, the combination of the input spatiotemporal patterns is transmitted as the output spatiotemporal pattern from the repeater device.

In a conventional optical communication system, overlaid or simultaneous spatiotemporal patterns are combined at each receiver or receiving computing device. In systems with a plurality of receiving computing devices, combining the input spatiotemporal patterns and emitting an output spatiotemporal pattern to a receiver or plurality of receivers offloads the summation or other combination operations to the repeater device instead of redundant operations on the plurality of receiving computing devices.

In some embodiments, the overlaid input spatiotemporal patterns include a body cells with information encoded therein. In some embodiments, the overlaid input spatiotemporal patterns include additional information to confirm spatial and/or temporal alignment, such as header information and/or border information or other alignment cells.

In some embodiments, the intensity of the data channel (e.g., color channel) at each cell of the body cells is summed, such as described herein. In some embodiments, the intensity of each data channel at each cell is compared against other data channels and/or against a threshold value to determine a single value of the combined output spatiotemporal pattern described herein. For example, the repeater controller may compare the intensity of a red data channel to an intensity of a blue data channel at particular cell and, upon determining the red intensity to be greater, drive the red LED of the corresponding pixel in the output spatiotemporal pattern. In some examples, the repeater controller may compare the intensity of a red data channel to threshold value at particular cell and, upon determining the red intensity to be below the threshold value, not drive the red LED of the corresponding pixel in the output spatiotemporal pattern to communicate an “off” state.

In some embodiments, combining the overlaid input spatiotemporal patterns includes averaging the intensity of a data channel at a particular cell. For example, the overlaid input spatiotemporal patterns may sum to an intensity of 1.8 for a given cell of the body cells. In some embodiments, the repeater controller may receive the header information (via the photoreceptors) and determine the presence of three concurrent overlaid input spatiotemporal patterns. As the measured intensity of the particular cell is the summed intensity, averaging the intensity may include dividing the measured intensity by the quantity of concurrent overlaid input spatiotemporal patterns according to the header information.

The alignment information may be a border, a pattern, spacers or other recognizable cells in the input spatiotemporal patterns that the repeater controller can use to shift the input spatiotemporal patterns relative to one another to properly align the input spatiotemporal patterns. For example, the first input spatiotemporal pattern and second input spatiotemporal pattern may impinge upon the light receptor array already aligned, while the third input spatiotemporal pattern may exhibit the same alignment information measured at different locations in the light receptor array. In some embodiments, the repeater controller shifts, rotates, displaces, or otherwise transforms the third input spatiotemporal pattern to align with the first input spatiotemporal pattern and second input spatiotemporal pattern. In some embodiments, the repeater controller reports an error to a user to inform the user of the spatial misalignment.

In some embodiments, a method of communicating spatiotemporal patterns includes detecting an input spatiotemporal pattern with a light receptor array of a repeater device, such as embodiment of a light receptors described herein. Detecting the input spatiotemporal pattern may include communicating an electrical signal from the light receptor(s) to a repeater controller of the repeater device as described herein).

In some embodiments, the method further includes driving a plurality of light sources in a light source array of the repeater device based at least partially on the input spatiotemporal pattern and transmitting an output spatiotemporal pattern generated by the plurality of light sources. In some embodiments, the output spatiotemporal pattern is substantially the same as the input spatiotemporal pattern. For example, the repeater device may receive an input spatiotemporal pattern as transmitted by a transmitter and emit an output spatiotemporal pattern to a receiver as though the receiver received the original input spatiotemporal pattern. In some embodiments, the output spatiotemporal pattern is different from the input spatiotemporal pattern. For example, the output spatiotemporal pattern may have additional information encoded in the output spatiotemporal pattern, such as header information, an additional data channel (e.g., color channel), or different encoding than the input spatiotemporal pattern as will described in more detail herein.

In some embodiments, the repeater device receives an input spatiotemporal pattern at an input brightness and emits an output spatiotemporal pattern at an output intensity (e.g., brightness) that is greater than the input intensity (e.g., brightness). For example, emitting the output spatiotemporal pattern at the greater brightness may extend the transmission range of the spatiotemporal communication system. In other examples, the repeater device may allow the use of a relatively low-power transmitter generating the spatiotemporal pattern in a longer-range spatiotemporal communication systems. For example, the original transmitter may lack the power to transmit a spatiotemporal pattern across a larger datacenter than was originally intended, and an active repeater according to some embodiments of the present disclosure may amplify the input spatiotemporal pattern.

In some embodiments, the repeater device modifies at least a portion of the input spatiotemporal pattern when emitting the output spatiotemporal pattern. In some embodiments, the output spatiotemporal pattern has a different resolution than the input spatiotemporal pattern. In some embodiments, the input spatiotemporal pattern has a first set of colors in the pattern (e.g., white and black corresponding to "on" and "off") and the output spatiotemporal pattern has a second set of colors (e.g., red and blue). The repeater device may change at least one color of the input spatiotemporal pattern based at least partially on optical filters used by the receivers imaging the repeating device.

In some embodiments, the repeater device temporally modifies the input spatiotemporal pattern. For example, the input spatiotemporal pattern may be transmitted to the repeater device and detected by a light receptor array of the repeater device of a first duration (e.g., 5 ms), and the repeater may emit the output spatiotemporal pattern for a second duration (e.g., 50 ms). In some embodiments, the repeater device delays the emission of the output spatiotemporal pattern by a delay duration after detecting the input spatiotemporal pattern. In some embodiments, the delay duration begins after detecting the input spatiotemporal pattern begins. For example, a 5 ms delay duration causes the repeater controller to begin driving the light sources 5 ms after the input spatiotemporal pattern is initially detected. In some embodiments, the delay duration begins after detecting the input spatiotemporal pattern ends. For example, a 5 ms delay duration causes the repeater controller to begin driving the light sources 5 ms after the input spatiotemporal pattern is no longer detected. In at least one example, delaying the communication of the spatiotemporal pattern can ensure that various computational tasks in a computing system are synchronized. For example, the repeater device may receive the input spatiotemporal pattern at T=0 ms to T=5 ms and emit the output spatiotemporal pattern at T>5 ms.

In some embodiments, the repeater controller drives the plurality of light sources to transmit the output spatiotemporal pattern for the same output duration as an input duration of the input spatiotemporal pattern. In some examples, the repeater device may emit the output spatiotemporal pattern for a longer output duration than the input duration of the input spatiotemporal pattern. In some examples, the repeater device may emit the output spatiotemporal pattern for a shorter output duration than the input duration of the input spatiotemporal pattern.

In some embodiments, the repeater controller continues to drive the plurality of lights sources and/or transmit the output spatiotemporal pattern indefinitely. In some embodiments, the repeater controller continues to drive the plurality of lights sources and/or transmit the output spatiotemporal pattern until a termination signal is received. In some embodiments, the termination signal includes detecting any other input spatiotemporal pattern. In some embodiments, the termination signal may be detected in the header information of another input spatiotemporal pattern (allowing the repeater device to ignore input spatiotemporal patterns that lack a termination signal). In some embodiments, the termination signal may be received through a different communication device or pathway than the light receptor(s) of the repeater device. For example, the repeater device may include or be in data communication with a radio-frequency transceiver through which the termination signal may be received. In at least one embodiment, transmitting the output spatiotemporal pattern indefinitely may allow any receivers in optical communication with the repeater device to access the output spatiotemporal pattern as needed. The repeater device may, in such examples, operate as spatiotemporal memory in the computing system.

It should be understood that while the present disclosure describes the repeater controller driving the light sources, the repeater controller may drive the light sources by activating or instructing another component of the electrical circuit to drive the light source(s). For example, driving the light source may include the repeater controller instructing a power supply to drive the light source, such as via a transistor of the drive circuit of the light source.

In some embodiments, the repeater device receives a plurality of input spatiotemporal patterns. In some embodiments, the intensity of the data channel (e.g., color channel) at each cell of the body cells is summed, such as described herein. In some embodiments, the intensity of each data channel at each cell is compared against other data channels and/or against a threshold value to determine a single value of the combined output spatiotemporal pattern described herein. For example, the repeater controller may compare the intensity of a red data channel to an intensity of a blue data channel at particular cell and, upon determining the red intensity to be greater, drive the red LED of the corresponding pixel in the output spatiotemporal pattern. In some examples, the repeater controller may compare the intensity of a red data channel to threshold value at particular cell and, upon determining the red intensity to be below the threshold value, not drive the red LED of the corresponding pixel in the output spatiotemporal pattern to communicate an "off" state.

In some embodiments, combining the overlaid input spatiotemporal patterns includes averaging the intensity of a data channel at a particular cell. For example, the overlaid input spatiotemporal patterns may sum to an intensity of 1.8 for a given cell of the body cells. In some embodiments, the repeater controller may receive the header information (via the photoreceptors) and determine the presence of three concurrent overlaid input spatiotemporal patterns. As the measured intensity of the particular cell is the summed intensity, averaging the intensity may include dividing the measured intensity by the quantity of concurrent overlaid input spatiotemporal patterns according to the header information.

In some embodiments, combining the overlaid spatiotemporal patterns includes aligning the spatiotemporal patterns. The alignment information may be a border, a pattern, spacers or other recognizable cells in the input spatiotemporal patterns that the repeater controller can use to shift the input spatiotemporal patterns relative to one another to properly align the input spatiotemporal patterns. For example, the first input spatiotemporal pattern and second input spatiotemporal pattern may impinge upon the light receptor array already aligned, while the third input spatiotemporal pattern may exhibit the same alignment information measured at different locations in the light receptor array. In some embodiments, the repeater controller shifts, rotates, displaces, or otherwise transforms the third input spatiotemporal pattern to align with the first input spatiotemporal pattern and second input spatiotemporal pattern. In some embodiments, the repeater controller reports an error to a user to inform the user of the spatial misalignment.

The present disclosure relates to systems and methods for communicating spatiotemporal patterns according to at least the examples provided in the sections below:

Clause 1. A device for communicating spatiotemporal patterns comprising: a light source array including a plurality of light sources; a light receptor array including a plurality of light receptors wherein at least one pixel of the light source array includes both a light source and a light receptor; and a repeater controller in data communication with the light receptor array and configured to: receive a first spatiotemporal pattern at the light receptor array, and drive at least a portion of the light source array based at least partially on the first spatiotemporal pattern to emit a second spatiotemporal pattern.

Clause 2. The device of clause 1, wherein at least one light source of the plurality of light sources is a light emitting diode (LED).

Clause 3. The device of any preceding clause, wherein at least one light source of the plurality of light sources is a 3-state light source.

Clause 4. The device of any preceding clause, wherein at least one light source of the plurality of light sources is a continuously variable light source.

Clause 5. The device of any preceding clause, wherein the plurality of light receptors is a quantity equal to that of the plurality of light sources.

Clause 6. The device of any of clauses 1-5, wherein a quantity of light receptors in the light receptor array is greater than a quantity of the light sources in the light source array.

Clause 7. The device of any preceding clause, wherein the repeater controller compares an input intensity of the first spatiotemporal pattern received at each light receptor of the light receptor array to a threshold value before driving the light source array.

Clause 8. The device of any preceding clause, wherein the first spatiotemporal pattern and second spatiotemporal pattern are different.

Clause 9. The device of any preceding clause, wherein the light source array and the light receptor array at least partially overlap.

Clause 10. A system for communicating spatiotemporal patterns, the system comprising: a spatiotemporal pattern transmitter configured to transmit a first spatiotemporal pattern; a spatiotemporal pattern receiver configured to receive a second spatiotemporal pattern; and a repeater device including: a light source array including a plurality of light sources; a light receptor array including a plurality of light receptors wherein at least one pixel of the repeater device includes both a light source and a light receptor; and a repeater controller in data communication with the light receptor array and configured to: receive a first spatiotemporal pattern at the light receptor array, and drive at least a portion of the light source array based at least partially on the first spatiotemporal pattern to emit a second spatiotemporal pattern.

Clause 11. The system of clause 10, wherein the spatiotemporal pattern transmitter includes at least one laser.

Clause 12. The system of clause 10 or 11, wherein the first spatiotemporal pattern and the second spatiotemporal pattern have a different resolution.

Clause 13. The system of any of clauses 10-12, further comprising a second spatiotemporal pattern transmitter configured to transmit a third spatiotemporal pattern, and the repeater controller configured to drive the light source array based at least partially on a combination of the first spatiotemporal pattern and the third spatiotemporal pattern.

Clause 14. A method for communicating spatiotemporal patterns, the method comprising: detecting an input spatiotemporal pattern with a light receptor array of a repeater device; driving a plurality of light sources in a light source array of the repeater device based at least partially on the input spatiotemporal pattern; and transmitting an output spatiotemporal pattern generated by the plurality of light sources.

Clause 15. The method of clause 14, wherein the input spatiotemporal pattern includes a plurality of spatiotemporal patterns at least partially overlapping.

Clause 16. The method of clause 15, further comprising combining the plurality of spatiotemporal patterns at the repeater device and wherein the output spatiotemporal pattern is based at least partially on the plurality of spatiotemporal patterns.

Clause 17. The method of any of clauses 14-16, wherein detecting the input spatiotemporal pattern has an input duration, and transmitting the output spatiotemporal pattern has an output duration that is greater than the input duration.

Clause 18. The method of any of clauses 14-17, wherein detecting the input spatiotemporal pattern includes detecting an input intensity, and transmitting the output spatiotemporal pattern has an output intensity that is greater than the input intensity.

Clause 19. The method of any of clauses 14-18, wherein transmitting the output spatiotemporal pattern includes continuing to transmit the output spatiotemporal pattern until a termination signal is received by the repeater device.

Clause 20. The method of any of clauses 14-19, wherein transmitting an output spatiotemporal pattern includes delaying transmitting the output spatiotemporal pattern a delay duration after detecting the input spatiotemporal pattern.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for communicating spatiotemporal patterns comprising:
- a light source array including a plurality of light sources;
- a light receptor array including a plurality of light receptors wherein at least one pixel of the light source array includes both a light source and a light receptor; and
- a repeater controller in data communication with the light receptor array and configured to:
  - receive a first spatiotemporal pattern at the light receptor array, and
  - drive at least a portion of the light source array based at least partially on the first spatiotemporal pattern to emit a second spatiotemporal pattern.

2. The device of claim 1, wherein at least one light source of the plurality of light sources is a light emitting diode (LED).

3. The device of claim 1, wherein at least one light source of the plurality of light sources is a 3-state light source.

4. The device of claim 1, wherein at least one light source of the plurality of light sources is a continuously variable light source.

5. The device of claim 1, wherein the plurality of light receptors is a quantity equal to that of the plurality of light sources.

6. The device of claim 1, wherein a quantity of light receptors in the light receptor array is greater than a quantity of the light sources in the light source array.

7. The device of claim 1, wherein the repeater controller compares an input intensity of the first spatiotemporal pattern received at each light receptor of the light receptor array to a threshold value before driving the light source array.

8. The device of claim 1, wherein the first spatiotemporal pattern and second spatiotemporal pattern are different.

9. The device of claim 1, wherein the light source array and the light receptor array at least partially overlap.

10. The device of claim 1, wherein the first spatiotemporal pattern includes a plurality of overlapping spatiotemporal patterns.

11. A system for communicating spatiotemporal patterns, the system comprising:
- a spatiotemporal pattern transmitter configured to transmit a first spatiotemporal pattern;
- a spatiotemporal pattern receiver configured to receive a second spatiotemporal pattern; and
- a repeater device including:
  - a light source array including a plurality of light sources;
  - a light receptor array including a plurality of light receptors wherein at least one pixel of the repeater device includes both a light source and a light receptor; and
  - a repeater controller in data communication with the light receptor array and configured to:
    - receive a first spatiotemporal pattern at the light receptor array, and
    - drive at least a portion of the light source array based at least partially on the first spatiotemporal pattern to emit a second spatiotemporal pattern.

12. The system of claim 11, wherein the spatiotemporal pattern transmitter includes at least one laser.

13. The system of claim 11, wherein the first spatiotemporal pattern and the second spatiotemporal pattern have a different resolution.

14. The system of claim 11, further comprising a second spatiotemporal pattern transmitter configured to transmit a third spatiotemporal pattern, and the repeater controller configured to drive the light source array based at least partially on a combination of the first spatiotemporal pattern and the third spatiotemporal pattern.

15. A method for communicating spatiotemporal patterns, the method comprising:
- detecting an input spatiotemporal pattern with a single light receptor array of a repeater device, wherein the input spatiotemporal pattern includes a plurality of spatiotemporal patterns at least partially overlapping and the plurality of spatiotemporal patterns are detected at the single light receptor array;
- driving a plurality of light sources in a light source array of the repeater device based at least partially on the input spatiotemporal pattern; and
- transmitting an output spatiotemporal pattern generated by the plurality of light sources.

16. The method of claim 15, further comprising combining the plurality of spatiotemporal patterns at the repeater device and wherein the output spatiotemporal pattern is based at least partially on the plurality of spatiotemporal patterns.

17. The method of claim 15, wherein detecting the input spatiotemporal pattern has an input duration, and transmitting the output spatiotemporal pattern has an output duration that is greater than the input duration.

18. The method of claim 15, wherein detecting the input spatiotemporal pattern includes detecting an input intensity, and transmitting the output spatiotemporal pattern has an output intensity that is greater than the input intensity.

19. The method of claim 15, wherein transmitting the output spatiotemporal pattern includes continuing to transmit the output spatiotemporal pattern until a termination signal is received by the repeater device.

20. The method of claim 15, wherein transmitting the output spatiotemporal pattern includes delaying transmitting the output spatiotemporal pattern a delay duration after detecting the input spatiotemporal pattern.

* * * * *